(12) United States Patent
Avrahami et al.

(10) Patent No.: US 10,097,863 B2
(45) Date of Patent: *Oct. 9, 2018

(54) SYSTEM AND METHOD FOR LIVE SERVICE CONTENT HANDLING WITH CONTENT STORING SERVERS CACHING POPULAR CONTENT THEREIN

(71) Applicant: Qwilt, Inc., Redwood City, CA (US)

(72) Inventors: Hagai Avrahami, Hod-Hasharon (IL); Michael Groys, Hod-Hasharon (IL)

(73) Assignee: Qwilt, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/078,543

(22) Filed: Mar. 23, 2016

(65) Prior Publication Data

US 2016/0212454 A1    Jul. 21, 2016

Related U.S. Application Data

(63) Continuation-in-part of application No. 13/006,785, filed on Jan. 14, 2011, now Pat. No. 9,723,073.

(Continued)

(51) Int. Cl.
*G06F 15/173* (2006.01)
*H04N 21/231* (2011.01)
(Continued)

(52) U.S. Cl.
CPC .  *H04N 21/23103* (2013.01); *H04L 29/08729* (2013.01); *H04L 67/02* (2013.01);
(Continued)

(58) Field of Classification Search
CPC ........... H04L 29/08729; H04L 67/1095; H04L 29/08774; H04L 29/0881; H04L 29/08891;
(Continued)

(56) References Cited

U.S. PATENT DOCUMENTS 5,829,046 A * 10/1998 Tzelnic ............... G06F 12/0866
711/162
5,893,140 A *  4/1999 Vahalia ............... G06F 11/1435
706/908

(Continued)

OTHER PUBLICATIONS

Non-Final Office Action dated Sep. 25, 2012 for U.S. Appl. No. 13/006,785.

(Continued)

*Primary Examiner* — Davoud Zand
(74) *Attorney, Agent, or Firm* — M&B IP Analysts, LLC

(57) ABSTRACT

A computerized method for providing live content from a service delivery apparatus (SDA), the method comprises receiving a request from a user node (UN) for content, the request comprising a content identification (CID) and a content source (CS). The content of the CID is acquired to store in a fast access memory of the SDA upon determining that the content of the CID needs to be acquired to the SDA, and that the CS is a provider of live content. A redirect instruction is sent to the UN to redirect the request from the CS to the SDA. The content of the CID is sent to the UN from the fast access memory of the SDA.

22 Claims, 7 Drawing Sheets

Related U.S. Application Data

(60) Provisional application No. 61/375,836, filed on Aug. 22, 2010, provisional application No. 62/140,067, filed on Mar. 30, 2015, provisional application No. 62/146,266, filed on Apr. 11, 2015.

(51) Int. Cl.
*H04L 29/08* (2006.01)
*H04N 21/472* (2011.01)

(52) U.S. Cl.
CPC ...... *H04L 67/1095* (2013.01); *H04L 67/1097* (2013.01); *H04N 21/47202* (2013.01)

(58) Field of Classification Search
CPC ............. H04L 67/1097; H04L 67/2847; H04L 67/2842; H04L 67/2852
USPC .......... 709/223, 224; 370/252; 340/1.1–16.1; 714/39, 47.1–47.3
See application file for complete search history.

(56) References Cited

U.S. PATENT DOCUMENTS

| | | | |
|---|---|---|---|
| 5,933,603 A * | 8/1999 | Vahalia | G06F 12/0866 348/E5.008 |
| 5,944,789 A * | 8/1999 | Tzelnic | G06F 12/0813 707/999.007 |
| 5,948,062 A * | 9/1999 | Tzelnic | G06F 11/1435 348/E5.008 |
| 6,049,530 A | 4/2000 | Petersen et al. | |
| 6,061,504 A * | 5/2000 | Tzelnic | H04N 7/17318 348/E5.008 |
| 6,363,413 B2 | 3/2002 | Kidder | |
| 6,536,037 B1 | 3/2003 | Guheen et al. | |
| 6,615,166 B1 | 9/2003 | Guheen et al. | |
| 6,700,889 B1 | 3/2004 | Nun | |
| 6,772,193 B1 | 8/2004 | Igawa et al. | |
| 6,799,248 B2 * | 9/2004 | Scherr | G06F 17/30902 707/E17.12 |
| 6,823,401 B2 | 11/2004 | Feather et al. | |
| 6,831,893 B1 | 12/2004 | Ben Nun et al. | |
| 6,985,956 B2 | 1/2006 | Luke et al. | |
| 6,986,018 B2 | 1/2006 | O'Rourke et al. | |
| 7,149,698 B2 | 12/2006 | Guheen et al. | |
| 7,281,260 B2 | 10/2007 | Puente et al. | |
| 7,310,480 B2 | 12/2007 | Maciocco et al. | |
| 7,349,979 B1 | 3/2008 | Cieslak et al. | |
| 7,436,830 B2 | 10/2008 | Ben-Nun et al. | |
| 7,596,664 B2 * | 9/2009 | Ishikawa | G06F 12/0897 711/129 |
| 7,606,314 B2 | 10/2009 | Coleman et al. | |
| 7,685,254 B2 | 3/2010 | Pandya | |
| 7,697,557 B2 | 4/2010 | Segel | |
| 7,719,966 B2 | 5/2010 | Luft et al. | |
| 7,818,402 B1 | 10/2010 | Zhang | |
| 7,912,921 B2 | 3/2011 | O'Rourke et al. | |
| 7,957,396 B1 | 6/2011 | Kohn et al. | |
| 8,065,559 B2 | 11/2011 | Kamath et al. | |
| 8,607,166 B2 | 12/2013 | Jalon et al. | |
| 8,621,101 B1 | 12/2013 | Starr et al. | |
| 8,706,900 B2 * | 4/2014 | Carver | H04L 67/2852 709/203 |
| 8,937,942 B1 | 1/2015 | Li et al. | |
| 2001/0049732 A1 * | 12/2001 | Raciborski | G06F 17/30864 709/224 |
| 2001/0051980 A1 * | 12/2001 | Raciborski | G06F 17/30864 709/203 |
| 2002/0006124 A1 | 1/2002 | Jimenez et al. | |
| 2002/0040366 A1 * | 4/2002 | Lahr | G06F 17/30887 |
| 2002/0040404 A1 * | 4/2002 | Lahr | H04L 29/06027 709/231 |
| 2002/0042817 A1 * | 4/2002 | Lahr | H04N 21/2221 709/213 |
| 2002/0048269 A1 * | 4/2002 | Hong | H04L 29/06 370/389 |
| 2002/0062372 A1 | 5/2002 | Hong et al. | |
| 2002/0136204 A1 * | 9/2002 | Chen | G06Q 30/02 370/352 |
| 2003/0097443 A1 | 5/2003 | Gilbert et al. | |
| 2003/0221127 A1 * | 11/2003 | Risan | H04L 63/062 725/25 |
| 2004/0128693 A1 * | 7/2004 | Weigand | H04N 7/17318 725/95 |
| 2004/0133776 A1 | 7/2004 | Putzolu | |
| 2004/0181579 A1 * | 9/2004 | Huck | G06Q 10/10 709/205 |
| 2005/0015702 A1 | 1/2005 | Shier et al. | |
| 2005/0022237 A1 * | 1/2005 | Nomura | H04N 5/44543 725/39 |
| 2005/0213514 A1 | 9/2005 | Su et al. | |
| 2005/0289111 A1 | 12/2005 | Tribble et al. | |
| 2006/0129697 A1 | 6/2006 | Vange et al. | |
| 2006/0168318 A1 | 7/2006 | Twiss | |
| 2006/0224687 A1 * | 10/2006 | Popkin | G06F 17/30132 709/217 |
| 2006/0271972 A1 | 11/2006 | Pai et al. | |
| 2007/0050686 A1 | 3/2007 | Keeton et al. | |
| 2007/0124781 A1 | 5/2007 | Casey et al. | |
| 2007/0192474 A1 * | 8/2007 | Decasper | H04L 67/306 709/223 |
| 2007/0244987 A1 * | 10/2007 | Pedersen | H04L 63/0272 709/217 |
| 2008/0010381 A1 * | 1/2008 | Barraclough | G06F 17/30867 709/228 |
| 2008/0307343 A1 | 12/2008 | Robert et al. | |
| 2009/0083279 A1 | 3/2009 | Hasek | |
| 2009/0119734 A1 * | 5/2009 | Deshpande | H04N 7/17318 725/118 |
| 2009/0172565 A1 * | 7/2009 | Jackson | H04L 67/1095 715/753 |
| 2009/0193129 A1 | 7/2009 | Agarwal et al. | |
| 2009/0307757 A1 | 12/2009 | Groten | |
| 2009/0313437 A1 | 12/2009 | Sofman et al. | |
| 2010/0054257 A1 | 3/2010 | Dolganow et al. | |
| 2010/0082774 A1 | 4/2010 | Pitts | |
| 2010/0115072 A1 | 5/2010 | Payyappilly et al. | |
| 2010/0287227 A1 | 11/2010 | Goel et al. | |
| 2011/0055386 A1 | 3/2011 | Middleton et al. | |
| 2011/0078343 A1 * | 3/2011 | Resch | G06F 3/0617 710/33 |
| 2011/0107185 A1 * | 5/2011 | Grube | H04L 67/06 714/768 |
| 2011/0141887 A1 | 6/2011 | Klein et al. | |
| 2011/0153937 A1 | 6/2011 | Annamalaisami et al. | |
| 2012/0011271 A1 * | 1/2012 | Zhao | H04W 4/18 709/234 |
| 2012/0030212 A1 | 2/2012 | Koopmans et al. | |
| 2012/0047224 A1 | 2/2012 | Shemesh et al. | |
| 2012/0047252 A1 | 2/2012 | Maor et al. | |
| 2012/0057460 A1 | 3/2012 | Hussain et al. | |
| 2012/0084464 A1 | 4/2012 | Cochinwala et al. | |
| 2012/0117610 A1 | 5/2012 | Pandya | |
| 2012/0124618 A1 | 5/2012 | Ruiz-Velasco et al. | |
| 2012/0159329 A1 | 6/2012 | Chow et al. | |
| 2012/0159558 A1 | 6/2012 | Whyte et al. | |
| 2014/0108586 A1 | 4/2014 | Zhao | |
| 2016/0021057 A1 | 1/2016 | Frost et al. | |

OTHER PUBLICATIONS

Non-Final Office Action dated Jul. 26, 2012 in U.S. Appl. No. 13/006,875.

\* cited by examiner

SYSTEM AND METHOD FOR LIVE SERVICE CONTENT HANDLING WITH CONTENT STORING SERVERS CACHING POPULAR CONTENT THEREIN

CROSS-REFERENCE TO RELATED PATENT APPLICATION

This is a continuation-in-part application co-pending with the U.S. patent application Ser. No. 13/006,785, titled "A System for Detection of Content Servers and Caching Popular Content Therein", filed on Jan. 14, 2011, which claims priority from U.S. provisional patent application 61/375,836 filed on Aug. 22, 2010, all assigned to common assignee and are incorporated herein in their entireties by reference. This application claims priority from U.S. provisional patent application 62/140,067 filed on Mar. 30, 2015 and U.S. provisional patent application 62/146,266 filed on Apr. 11, 2015, the contents of both applications are hereby incorporated by reference into this application.

BACKGROUND

Field of the Invention

The disclosure generally relates to streaming of live content, and particularly to effectively manage and control the delivery of live content for better load balancing.

Service providers worldwide are facing a mounting problem of flattening revenues coupled with increasing costs brought forth by increasing usage of bandwidth, growing switching clients, subscriber saturation and price competition. These mobile and broadband providers are facing challenges in delivering new revenue generating services while seeing their over the top (OTT) counterparts reaping rewards from content delivered over the networks they built and maintained over years.

The vast majority of these OTT services are delivered over hypertext transfer protocol (HTTP), the de-facto protocol for application development and delivery. Whether it is video, social networking, search, or advertising, or whether it is over fixed line or mobile applications, it is most likely running over HTTP. However, this protocol is also the most process intensive protocol for network devices. Hence practically any increase in usage results in increase the traffic on the service providers.

Certainly controlling traffic on the Internet requires various levels of understanding of the traffic that flows through the network which also increases in its level of sophistication. Various systems and solutions have been offered to enable deep-packet-inspection (DPI) to enable an ever sophisticated ability to shape the traffic on the network. This system allows the service providers to better manage the network and its related resources and provide a higher level of quality of service (QoS) to increase revenues and profits. However, the rapid increase in the delivery of heavy bandwidth consuming data, such as video, requires a new level of handling system that is not available today in related art solutions. A known problem is that an access of a user node to a content source and a subsequent access by another user node to the same content result in additional traffic load on the content provider and on the entire network. When, for example, a popular video clip is accessed by multiple user nodes, there is a significant and noticeable degradation of the network performance that may even lead to a network failure. Some related art solutions attempt to store all the data in caches. However, the huge amounts of data where each and every packet is needed to be inspected, regardless of its source, makes this a daunting and impractical task.

It would be advantageous to provide service providers a solution that will enable them to effectively manage and control the delivery of heavy bandwidth consuming data such that the overall bandwidth requirements are loaded and shared across the network in general, particularly within the network of a specific service provider.

It would be further advantageous to provide service providers a solution that will enable them to effectively manage and control the delivery of live video content such that the overall bandwidth requirements are loaded and shared across the network in general, particularly within the network of a specific service provider.

SUMMARY

To realize the some of the advantages noted above, there is provided a computerized method for providing live content from a service delivery apparatus (SDA), the method comprises receiving a request from a user node (UN) for content, the request comprising a content identification (CID) and a content source (CS). The content of the CID is acquired to store in a fast access memory of the SDA upon determining that the content of the CID needs to be acquired to the SDA, and that the CS is a provider of live content. A redirect instruction is sent to the UN to redirect the request from the CS to the SDA. The content of the CID is sent to the UN from the fast access memory of the SDA. The computerized method of claim 1, wherein the fast access memory is one of a random-access memory (RAM) and a solid-state drive (SSD).

In a specific enhancement the fast access memory is one of a random-access memory (RAM) and a solid-state drive (SSD).

In another specific enhancement, the SDA include a storage and the fast access memory.

In yet another specific enhancement, a video-on-demand (VOD) content is stored in the storage and a live broadcast content is stored in the fast access memory.

In still another specific enhancement the method further comprises generating a content collection identification (CCID), the CCID comprising at least the requested CID.

Still more specifically the method further comprises acquiring each CID of the CCID from the CS to the SDA.

Still more specifically, the method further comprises acquiring continuously at least a new CID to the SDA, wherein the CCID is continuously updated with at least the new CID.

Even more specifically, the old CID is removed from the CCID, and the method further comprises determining a time period during which the content of the old CID is stored; and deleting the content of the old CID after the time period has elapsed.

Even more specifically, the removed old CID is stored in the storage.

Still more specifically, the step of determining if the content of the CID needs to be acquired to the SDA further comprises counting the number of requests for the content of the CID for each CID.

Still more specifically, acquiring the content is performed after the number of requests for the content of the CID exceeds a counting threshold.

More specifically, the redirect instruction is sent to the UN before the content of the CID is acquired.

Another aspect of the disclosed teachings is a service delivery apparatus (SDA) for providing live content from a content source (CS) to at least a user node, comprising a first network interface to sniff traffic between at least a first portion of a network and at least a second portion of a network. A storage stores at least information of content received through the first network interface. A second network interface is configured to communicate with the at least a first portion of a network and the at least a second portion of a network. A fast access memory and a processing unit are provided. A memory is proved containing instructions that when executed by the processing unit causes the SDA to: receive a request for content from a user node (UN), the request comprising a content identification (CID) and the CS; acquire the content of the CID to store in a fast access memory of the SDA upon determining that the content of the CID needs to be acquired to the SDA, and that the CS is a provider of live content; send a redirect instruction to the UN to redirect the request from the host CS to the SDA; and send the content of the CID to the UN from the fast access memory of the SDA.

Specifically, the fast access memory is one of a random-access memory (RAM) and a solid-state drive (SSD).

More specifically, the memory further contains instructions that when executed by the processing unit causes the SDA to: generate a content collection identification (CCID), the CCID comprising at least the requested CID.

More specifically, the memory further contains instructions that when executed by the processing unit causes the SDA to: acquire each CID of the CCID from the CS to the SDA.

More specifically, the CCID is continuously updated with at least a new CID, and the memory further contains instructions that when executed by the processing unit causes the SDA to: acquire at least the new CID continuously to the SDA.

More specifically, an old CID is removed from the CCID, and the memory further contains instructions that when executed by the processing unit causes the SDA to: determine a time period during which the content of the old CID is stored; and delete the content of the old CID after the time period is reached.

More specifically, the removed old CID is stored in the storage.

More specifically, the memory further contains instructions that when executed by the processing unit to determine if the content of the CID needs to be acquired to the SDA, further causes the SDA to: count the number of requests for the content of the CID for each CID.

More specifically, acquiring the content is performed after the number of requests for the content of the CID is exceeded a threshold of a counting.

More specifically, the redirect instruction is sent to the UN before the content of the CID is acquired.

BRIEF DESCRIPTION OF THE DRAWINGS

The subject matter that is disclosed herein is particularly pointed out and distinctly claimed in the claims at the conclusion of the specification. The foregoing and other objects, features and advantages will be apparent from the following detailed description taken in conjunction with the accompanying drawings.

DETAILED DESCRIPTION

Figure 1A:
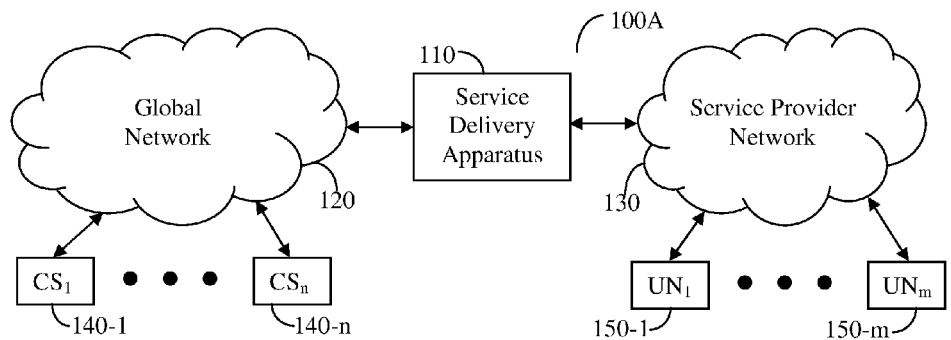
FIG. 1A—is a block diagram of a basic network system operating as a bump-in the wire according to an exemplary embodiment FIG. 1B—is a block diagram of a basic network system operating as a sniffer according to an exemplary embodiment FIG. 2—is a block diagram of an apparatus to identify content sources and provide content from the apparatus according to an exemplary embodiment FIG. 3—is a flowchart depicting the identification of a content source according to an exemplary embodiment FIG. 4—is a flowchart depicting the storage of content from identified content sources in the storage of the apparatus according to an exemplary embodiment FIG. 5—is a flowchart describing the providing of content to a requesting node according to an exemplary embodiment FIG. 6—is a flowchart of a computerized method for providing live content from a service delivery apparatus (SDA) according to an exemplary embodiment FIG. 7—is a network sequence diagram of a plurality of user nodes requesting content from a content source according to an exemplary embodiment FIG. 8—is a network sequence diagram of a plurality of user nodes requesting content from a content source according to another exemplary embodiment.

It is important to note that the exemplary embodiments disclosed herein are only examples of the many advantageous uses of the innovative teachings herein. In general, statements made in the specification of the present application do not limit any of the various claims. Moreover, some statements may apply to some features but not to others. In general, unless otherwise indicated, singular elements may be a plural and vice versa with no loss of generality. In the drawings, like numerals refer to like parts through several views.

A service delivery apparatus (SDA) stores live content in a fast access memory and provides the content to a plurality of user nodes (UNs) by redirecting the content requests from the plurality of UNs to a content source through the SDA. In certain exemplary embodiments, a redirect instruction is sent to the UNs before the content is acquired by the SDA. By sending the redirect instruction before the content is acquired, the SDA is able to serve more UNs than where the content is first acquired and then redirect instructions are sent. Typically, it is efficient to store video on demand (VOD) content in a storage, and live broadcast in a fast access memory, from which content can be delivered faster than from storage.

Figure 1B:
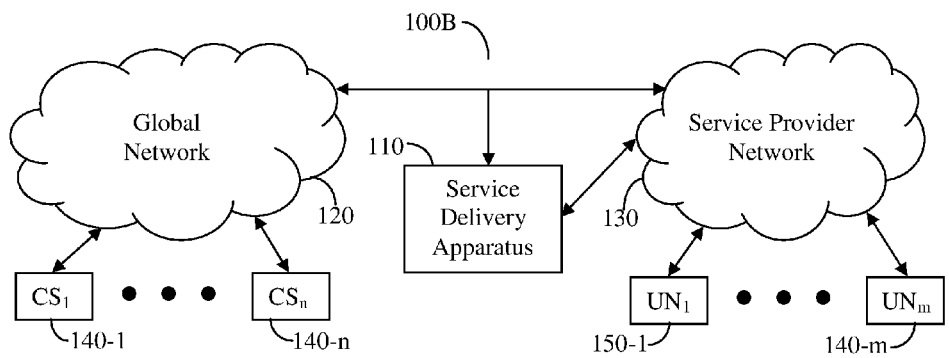

Reference is now made to FIG. 1A where an exemplary and non-limiting block diagram 100A of a basic network system according to an exemplary embodiment is shown. The system depicted comprises of a global network 120 and a service provider network 130 that are coupled by a 'bump-in-the-wire' apparatus 110. While the network 120 and 130 are shown as detached from each other it should be noted that this is only an exemplary configuration and other configurations are possible without departing from the principles of the disclosure. A network may be a Local Area Network (LAN), Wide Area Network (WAN), Metro Area Network (MAN), World Wide Web (WWW), Internet, combinations thereof, or the like. There are one or more content sources (CSs) connected to the global network 120, shown as $CS_1$ 140-1 through $CS_n$ 140-n, commonly referred to as CS 140. The content sources provide content upon request, for example video clips, from the appropriate CS to the requestor. There are one or more user nodes (UNs) connected to the service provider network 130, shown as $UN_1$ 150-1 through $UN_m$ 150-m, commonly referred to as UN 150. When an UN 150 requests content from a CS 140, it is transferred, according to the embodiment through a service delivery apparatus (SDA) 110, the function of which is described in more detail herein below. Generally, the SDA 110 may provide the requested content from its storage, or when such content or portions thereof are not in the storage of the SDA 110, then the request is forwarded to the appropriate CS 140 for the delivery of the content, as further described below. FIG. 1B depicts an exemplary and non-limiting block diagram 100B of a basic network system operating as a sniffer according to an exemplary embodiment. Operating similarly to the system shown in FIG. 1A, the system 100B has a SDA 110 connected in a sniffer mode, i.e., the SDA merely observes the traffic moving between a global network 120 and a service provider network 130 without routing packets through it. When the SDA 110 is connected in sniffer mode, it will typically connect to the service provider network 130 through a separate communication port to provide content stored therein to a destination connected to the service provider network 130.

Figure 2:
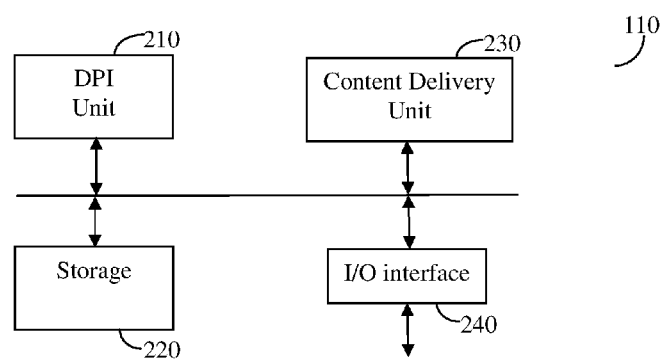

FIG. 2 provides an exemplary and non-limiting block diagram of a SDA 110 that identifies content sources and provides content from the apparatus in accordance with an exemplary embodiment. The SDA 110 comprises a deep-pocket-inspection (DPI) unit 210, a storage 220, a content delivery unit (CDU) 230 and an input/output interface 240. According to the embodiment, the DPI unit 210 performs two separate tasks. The first task is to identify sources of content that potentially contain data that may be worthwhile to store in the storage 220. For example, video servers may be located throughout the global network 120 and accessed randomly by UNs 150 through the service provider network 130. In order to improve the deficiencies of related art solutions, the apparatus 110 is implemented differently. The DPI unit 210 is provided with data types to look for in data packets that are transmitted through the apparatus 110. Instead of inspecting each and every packet, DPI unit 210 may inspect only one in a certain number of packets (for example, one-in-a-thousand packets) out of the entire traffic, thereby significantly lowering the processing load. It should be understood that the method for selecting the sampled packets is typically not performed by using a simple counter to process one out of every predetermined number of packets. Instead, the source and the destination addresses from each packet are fed into a hash function, the hash function result is compared to a configurable threshold, and the result of this comparison determines if the packet is inspected or not. In addition, it should be understood that the hash function is symmetric with respect to the source and the destination addresses, such that swapping the source address and the destination address does not change the hash result. In another exemplary embodiment, a source and a destination ports may also be used as part of the hash function operation. This guarantees that each flow comprising of multiple packets sent between a UN 150 and a CS 140 is either fully ignored or fully inspected. Upon determination that a specific CS 140 provides a desired data type, the identification of that CS 140 is stored. Any future packet received from or sent to the identified CS 140 is inspected by the DPI unit 210, and if the packet contains content that may be worthwhile to store, such content is stored in the storage 220. This inspection ensures that a demand for highly popular content from a popular CS 140 is likely to be quickly detected while infrequent access to a CS 140 would typically not impact the operation of the system. It should be noted that identification of a CS 140 does not have to be on the first detection of a data, and threshold levels may be used, as well as an aging mechanism so that relatively infrequently accessed CSs 140 would lose older access count so the CSs 140 does not hit the threshold value.

While DPI unit 210 operates on packets that arrive from CSs 140, the CDU 230 operates with respect to requests for content received from the UNs 150 through the service provider network 130. Upon receipt of such a request, the DPI 210 first determines if the content of the requested CS 140 actually is stored in the storage 220 by checking that the CS 140 identification is stored in to the apparatus 110. If the identification is found, then the storage 220 is checked for the possibility of delivery of the content or portions thereof. If the entire content or portions thereof are found, then they are delivered to the requesting UN 150. If the entire content or certain portions are missing, then the request is forwarded to the appropriate CS 140. Storage 220 may be semiconductor media, magnetic media, or any other type of storage media appropriate for the storage of content.

Figure 3:
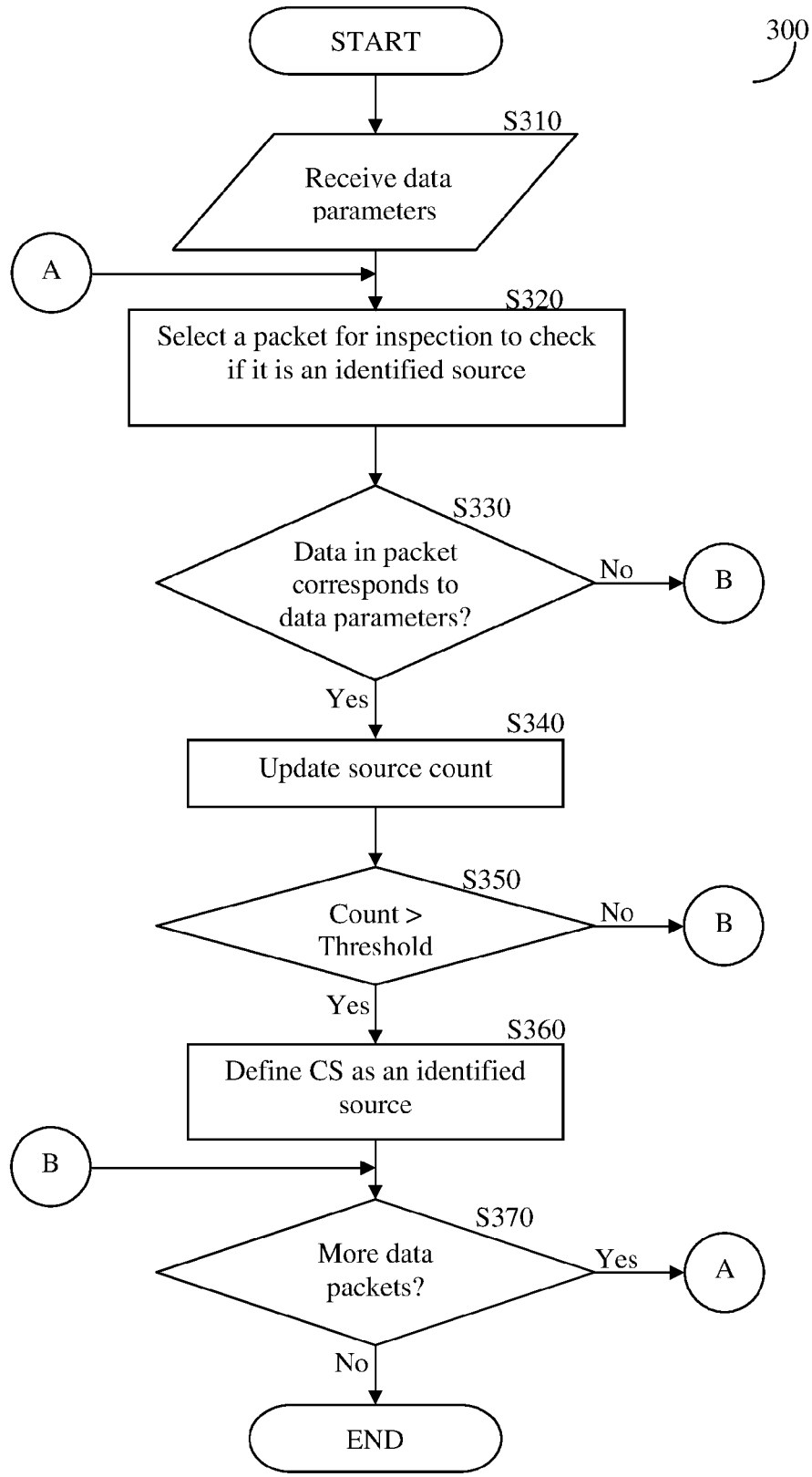

Reference is now made to FIG. 3 of an exemplary and non-limiting flowchart 300 depicting the identification of a content source in accordance with an exemplary embodiment. In S310, an apparatus receives and/or fetches parameters relating to the data of interest in the CSs. For example, it may contain parameters pertaining to video data type. In S320, packets are selected from the network traffic, for example, a global network 120. The ratio between the number of packets that pass through the network and the number inspected may be configured, so it could be one-in-a-thousand, one-in-ten-thousand, and so on. In S330, the data in the packet is checked to see if it corresponds to the data parameters, e.g., contain video data, and if so execution continues to S340; otherwise, execution continues to S370. In S340, the count of the CS 140 is updated, for example, by incrementing the value of a counter. In S350, it is checked if the count for that CS 140 has exceeded a threshold value, and if so, execution continues to S360; otherwise, execution continues to S370. In one exemplary embodiment, the count may also have an aging mechanism (not shown) as described above. Furthermore, different data types may have different thresholds, different count increases, and different count aging. In S360, the CS 140 is identified as a source of content eligible for the storage 220. In S370, it is checked if there are more data packets to be inspected, and if so, execution continues to S320; otherwise execution terminates.

Figure 4:
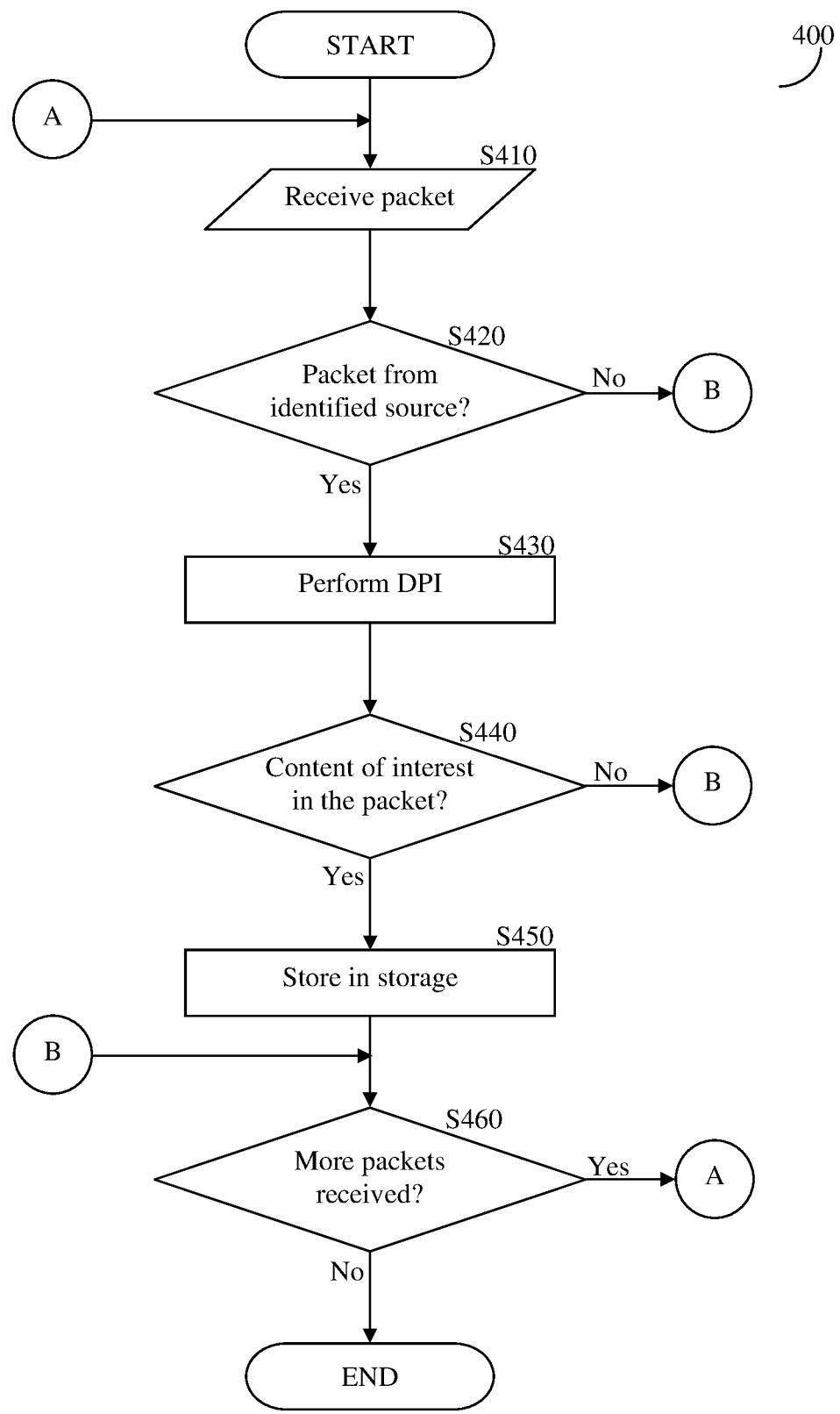

Reference is now made to FIG. 4 of an exemplary and non-limiting flowchart 400 depicting the storage of content from identified CS 140 in the storage 220 of the apparatus 110 according to an exemplary embodiment. In S410, a packet is received by apparatus 110. In S420, it is checked whether the received packet is from an identified CS 140, and if so, execution continues to S430; otherwise execution continues to S460. In S430, the received packet is inspected by a DPI unit 210 to identify content of the packet. This step is performed to check if the packet actually contains the content of interest so waste of storage space in the storage 220 can be prevented from storing unnecessary content because it is from an identified CS 140. In S440, it is checked whether such content of interest was found, and if so, execution continues to S450; otherwise, execution continues to S460. In S450, the content of the received packet is stored in the storage 220. In S460, it is checked whether more packets are received, and if so, execution continues to S410; otherwise, execution terminates.

Figure 5:
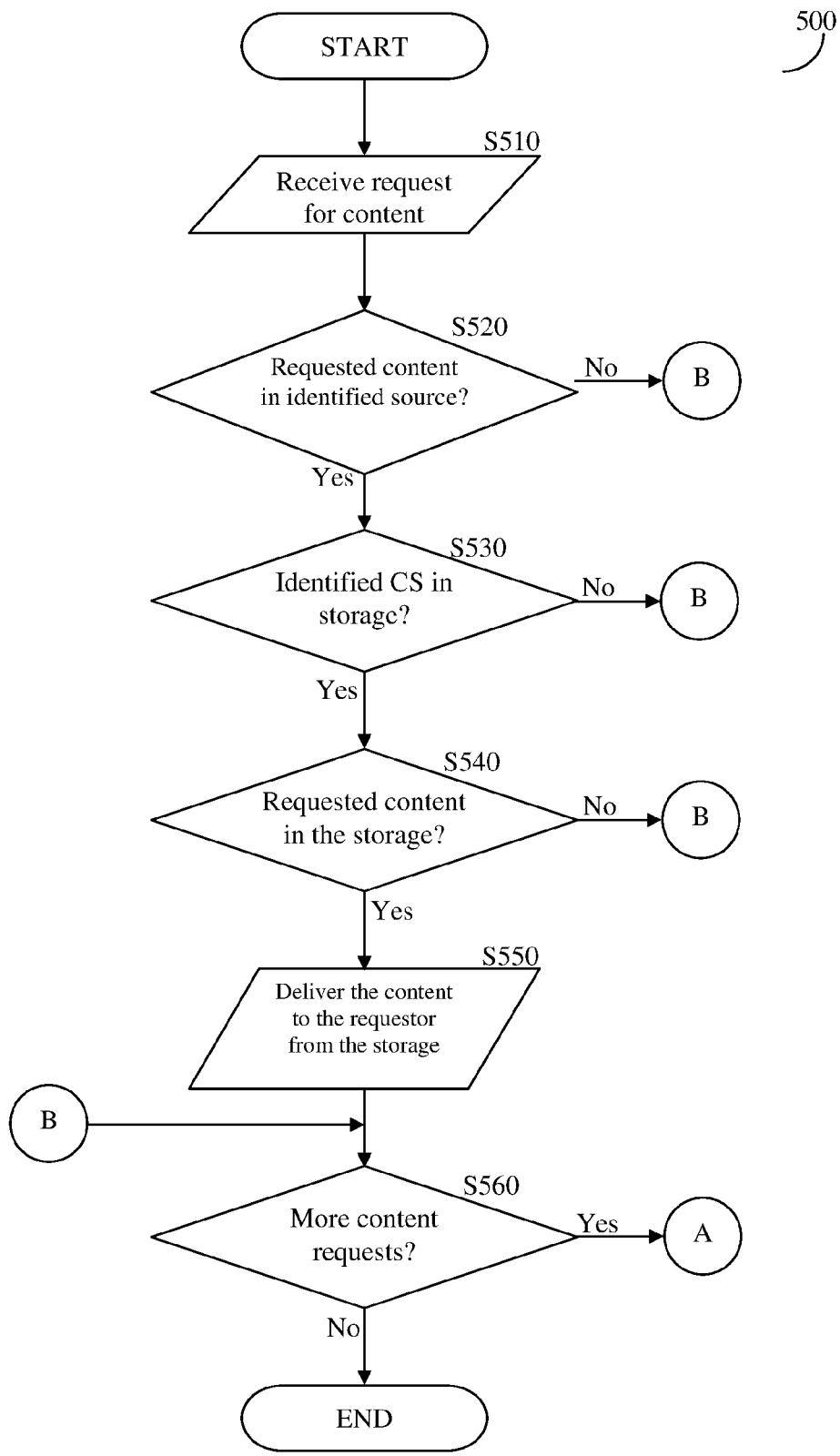

Reference is now made to FIG. 5 of an exemplary and non-limiting flowchart 500 describing the providing of content to a requesting UN 150 according to an exemplary embodiment. In S510, an apparatus 110 receives a request for content from a UN 150. In S520, it is checked if the requested content is in an identified CS 140, and if so, execution continues to S530; otherwise, execution continues to S560. In S530, it is checked whether the identified CS 140 is stored in the storage 220, and if so, execution continues to S540; otherwise, execution continues to S560. In S540, it is checked whether the requested content is in the storage 220, and if so, execution continues to S550; otherwise, execution continues to S560. In S550, the content is delivered to the requesting UN 150. In S560, it is checked whether additional content requests exist, and if so, execution continues to S510; otherwise, execution terminates.

In one exemplary embodiment, upon detecting that a portion of the requested content is in the storage 220 and deliverable to the requesting UN 150, such content is delivered immediately to the UN 150 while only the missing portions of the content is requested from the corresponding CS 140. Hence, a request from the CDU 230 may be for the portion of the requested content. In an exemplary embodiment, once a DPI unit 210 determines that a CS 140 may contain content that needs to be stored in storage 220, the packets from such CS 140 are consistently inspected for determination of popular content.

Figure 6:
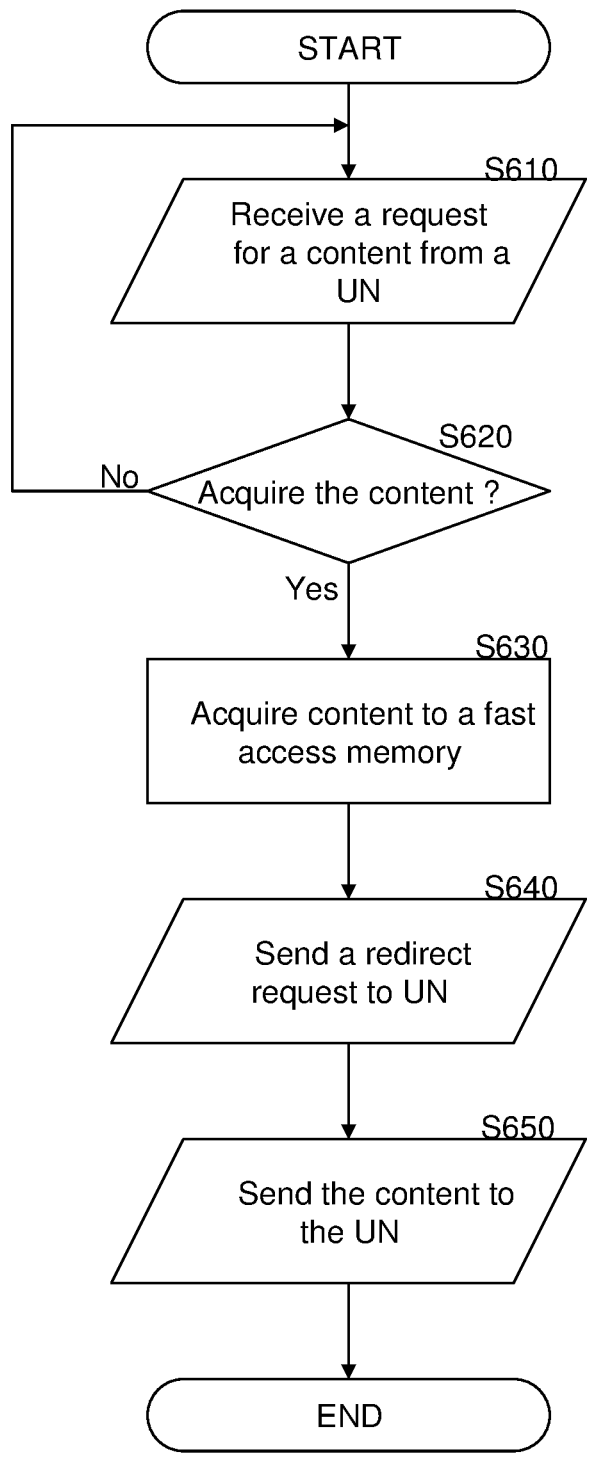

FIG. 6 is a non-limiting exemplary flowchart of a computerized method for providing live content from a service delivery apparatus (SDA) 110. In S610, a request is received from a user node (UN) for content, the request including a content identification (CID), and a live content source or host, from which to receive the content. The request may further include a content collection identification (CCID), wherein the CCID includes a plurality of CIDs. In certain exemplary embodiments, a CCID may be generated by a system, such as an SDA. In S620, it is determined if the content needs to be acquired in the SDA. Such determination may be performed, for example, by the methods disclosed herein. If it is determined to be acquired, execution continues to S630, otherwise execution continues to S610. In S630, the content of the CID is acquired in a fast access memory of the SDA. In certain exemplary embodiments where the request includes a CCID, or where one is generated, content of each CID in the CCID is acquired. In some exemplary embodiments, the CCID is continuously updated with at least a new CID. In some exemplary embodiments, an SDA may include a storage, such as storage 220, and a fast access memory. The storage 220 may store content which does not require fast access, and may be implemented as a magnetic storage device. The fast access memory may be implemented, for example, as a random-access memory (RAM) or a solid-state drive (SSD) which is able to provide content faster than storage 220. This is particularly advantageous for an SDA which provides, for example, both video-on-demand (VOD) and live broadcasts. Typically, it is efficient to store VOD content in a storage, and live broadcast in a fast access memory. The nature of live broadcasts is such that content is needed to a user node for a typically short window of time. Some content sources allow user nodes to access portions of content for a predefined period of time. For example, a sports game may be accessible up to two hours after the initial broadcast, allowing a user of a UN to access the content from the beginning. In S640, a redirect instruction is sent to the UN to redirect traffic from the host to the SDA. In S650, the content is sent to the UN from the SDA.

A CCID may contain CIDs which correspond to a time frame of the live broadcast. In such an exemplary embodiment, new CIDs may be added and older CIDs may be removed from the CCID as a function of time. A time frame may be determined by the SDA, after a content corresponds to an old CID, which was removed from the CCID, is removed from the fast access memory. In certain exemplary embodiments, the content may be stored in the storage 220 once it is removed from the fast access memory. In some exemplary embodiments, it may be further advantageous to distinguish a live event from live channels. A live channel may be, for example, a television channel with regular programming, which further broadcasts over internet protocol, and thus differs from regular content by not having a predefined content time length. A live event is a single event which is not a regular broadcast, such as election coverage, monarch's coronation, a finals game in sports, etc. Such events may or may not have a predefined content time length.

In certain exemplary embodiments where a UN requests live content from a content source, a redirect request may be sent to the UN before the content is acquired by the SDA. By sending the redirect instruction before the content is acquired, the SDA is able to serve more UNs than were the content first acquired and then redirect instructions are sent.

Figure 7:
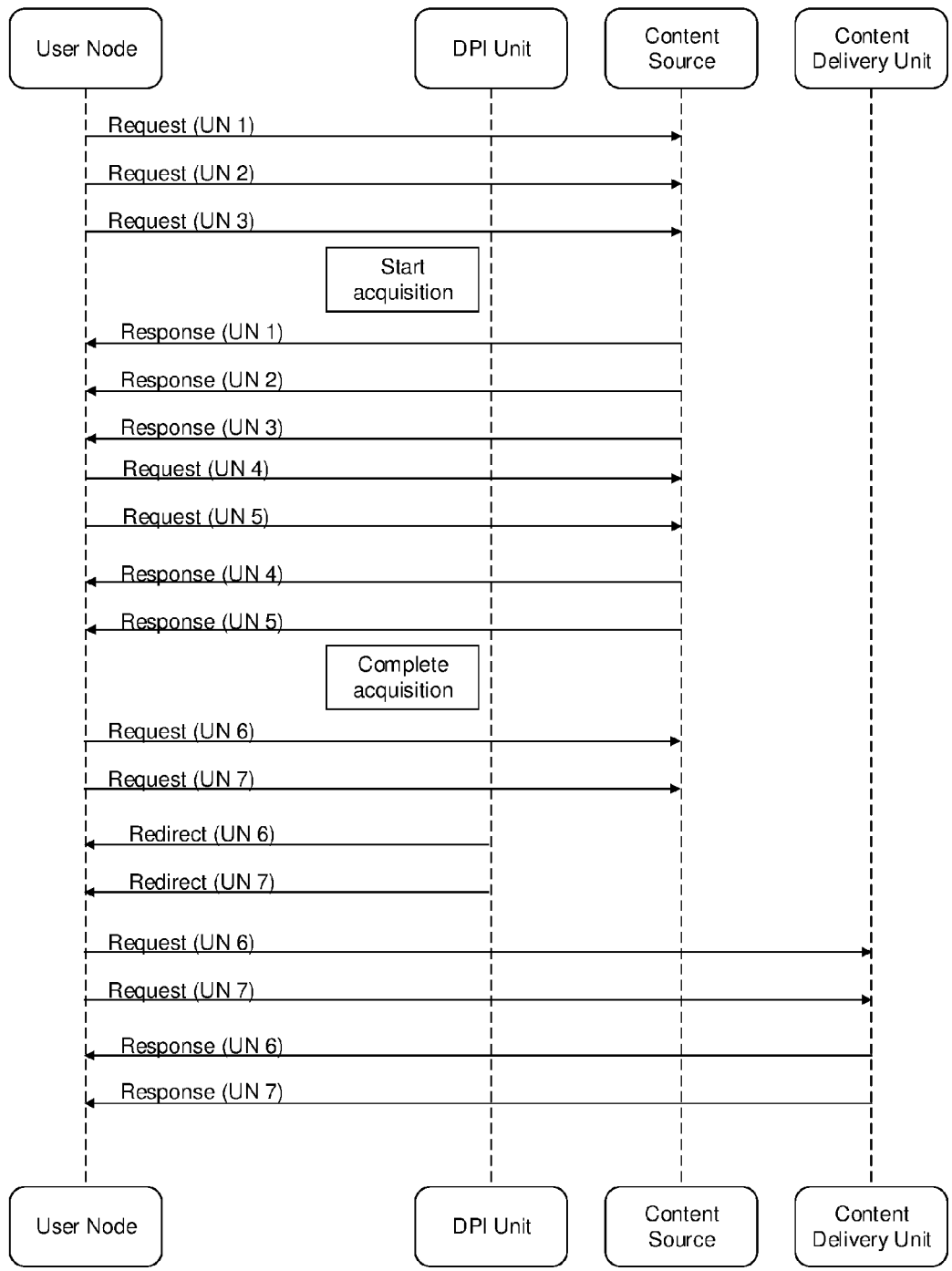

FIG. 7 is a non-limiting exemplary network sequence diagram of a plurality of user nodes requesting content from a content source according to an exemplary embodiment. UNs 1 through 3 send a request to a CS for a content. A DPI unit of an SDA receives the requests, and the SDA determines to begin acquisition of the content. UNs 3 and 4 send a request for the content from the CS. The DPI unit receives the responses from UNs 1 through 5 after each UNs completes the acquisition of the content. Once the content is acquired and saved in the fast access memory of the SDA110, upon receiving requests from UNs 6 and 7, a redirect instruction is sent to UNs 6 and 7 to request the content from the SDA. In this configuration, the SDA is able to serve UNs 6 and 7.

Figure 8:
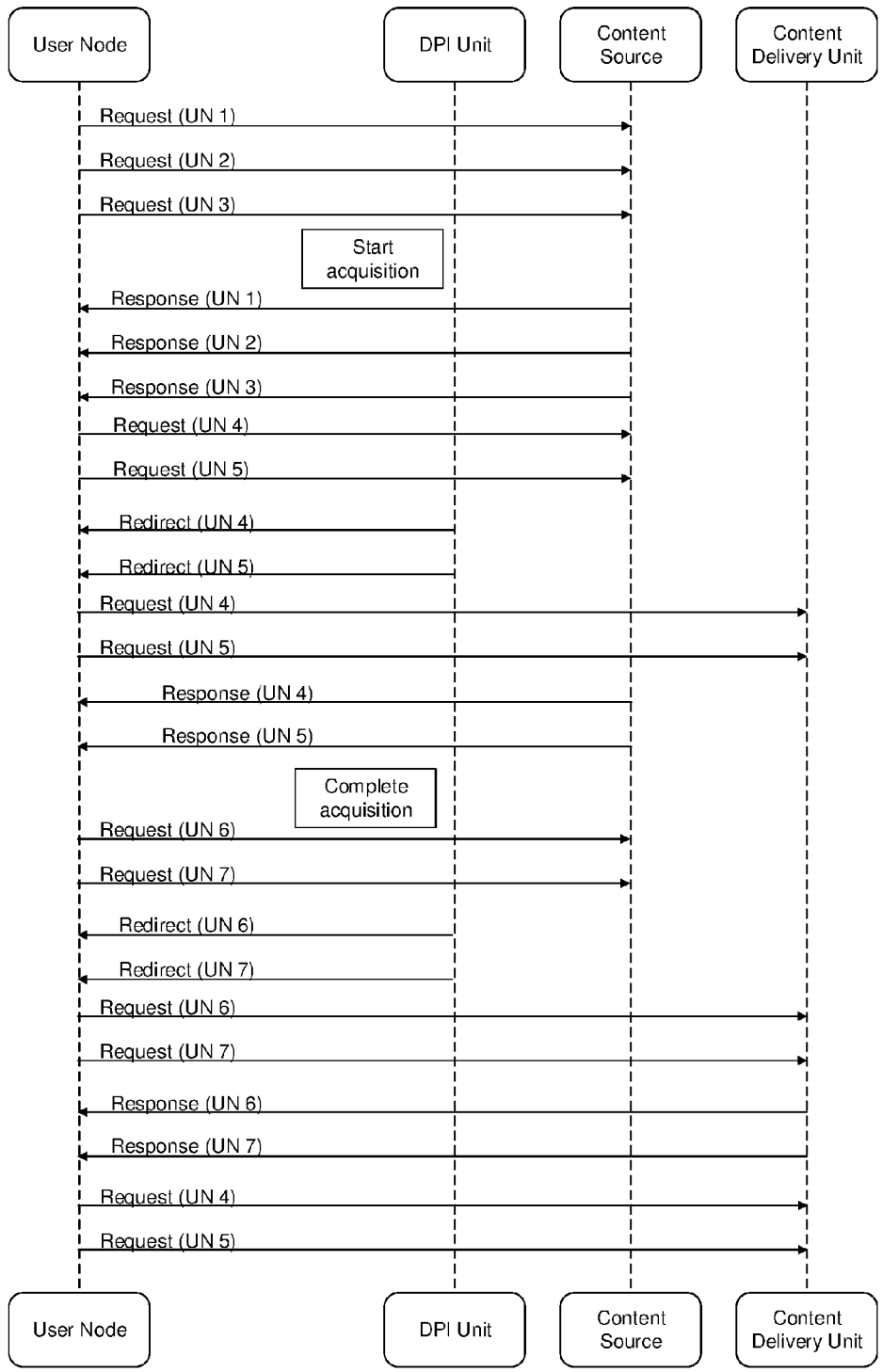

FIG. 8 is a non-limiting exemplary network sequence diagram of a plurality of user nodes requesting content from a content source according to another exemplary embodiment. UNs 1 through 3 send a request to a CS for a content. A DPI unit of an SDA receives the requests, and the SDA determines to begin acquisition of the content. UNs 4 and 5 send a request for the content from the CS. A redirect instruction is sent from the SDA to UNs 4 and 5. The DPI unit receives the responses from UNs 1 through 3 after each UNs completes the acquisition of the content. While the content is acquired and stored in the fast access memory of the SDA 110, UNs 4 and 5 receive content from the SDA. Upon receiving requests from UNs 6 and 7, a redirect instruction is sent to UNs 6 and 7 to request the content from the SDA. In this configuration, the SDA is able to serve UNs 4 through 7, by redirecting UNs 4 and 5 before acquisition of the content is complete.

The principles disclosed may be implemented as hardware, firmware, software or any combination thereof. Moreover, the software is preferably implemented as an application program tangibly embodied in a program storage unit or computer readable medium. The application program may be uploaded to, and executed by a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit, a printing unit, and/or display unit.

All examples and conditional languages recited herein are intended for pedagogical purposes to aid the reader in understanding the principles disclosed and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for providing live content from a service delivery apparatus (SDA), the method comprising:
    receiving, at the SDA, a request from a user node (UN) for content, the request comprising a content identification (CID) and a content source (CS);
    acquiring the content of the CID, by the SDA, to store in a fast access memory of the SDA upon determining that the content of the CID needs to be acquired to the SDA, and that the CS is a provider of live content;
    sending, by the SDA, a redirect instruction to the UN to redirect the request from the CS to the SDA; and
    sending, by the SDA, the content of the CID to the UN from the fast access memory of the SDA;
    wherein the SDA includes a slower storage than the fast access memory; and
    wherein a video-on-demand (VOD) content is stored in the slower storage and a live broadcast content is stored in the fast access memory.

2. The computerized method of claim 1, wherein the fast access memory is one of a random-access memory (RAM) and a solid-state drive (SSD).

3. The computerized method of claim 1, further comprising:
    generating a content collection identification (CCID), the CCID comprising at least the requested CID.

4. The computerized method of claim 3, further comprising:
    acquiring content of each CID of the CCID from the CS to the SDA.

5. The computerized method of claim 3, further comprising:
    acquiring continuously content of at least a new CID to the SDA, wherein the CCID is continuously updated with at least the new CID content.

6. The computerized method of claim 3, wherein an old CID is removed from the CCID, further comprising:
    determining a time period during which the content of the old CID is stored; and
    removing the content of the old CID after the time period has elapsed from the fast access memory.

7. The computerized method of claim 6, wherein the content of the removed old CID is stored in the slower storage.

8. The computerized method of claim 1, wherein determining if the content of the CID needs to be acquired to the SDA further comprises:
    counting the number of requests for the content of the CID for each CID.

9. The computerized method of claim 8, wherein acquiring the content is performed after the number of requests for the content of the CID exceeds a counting threshold.

10. The computerized method of claim 1, wherein the redirect instruction is sent to the UN before the content of the CID is acquired.

11. The computerized method of claim 1, wherein the live broadcast is a live event.

12. A service delivery apparatus (SDA) for providing live content from a content source (CS) to at least a user node, comprising:
    a first network interface to sniff traffic between at least a first portion of a network and at least a second portion of a network;
    a second network interface configured to communicate with the at least a first portion of a network and the at least a second portion of a network;
    a fast access memory;
    a processing unit; and
    a memory containing instructions that when executed by the processing unit causes the SDA to:
    receive a request for content from a user node (UN), the request comprising a content identification (CID) and the CS;
    acquire the content of the CID to store in a fast access memory of the SDA upon determining that the content of the CID needs to be acquired to the SDA, and that the CS is a provider of live content;
    send a redirect instruction to the UN to redirect the request from the host CS to the SDA; and
    send the content of the CID to the UN from the fast access memory of the SDA;
    wherein the SDA further includes a slower storage than the fast access memory; and
    wherein a video-on-demand (VOD) content is stored in the slower storage and a live broadcast content is stored in the fast access memory.

13. The SDA of claim 12, wherein the fast access memory is one of a random-access memory (RAM) and a solid-state drive (SSD).

14. The SDA of claim 12, wherein the memory further contains instructions that when executed by the processing unit causes the SDA to: generate a content collection identification (CCID), the CCID comprising at least the requested CID.

15. The SDA of claim 14, wherein the memory further contains instructions that when executed by the processing unit causes the SDA to:
    acquire content of each CID of the CCID from the CS to the SDA.

16. The SDA of claim 14, wherein the CCID is continuously updated with at least a new CID, and the memory further contains instructions that when executed by the processing unit causes the SDA to:
    acquire content of at least the new CID continuously to the SDA.

17. The SDA of claim 14, wherein an old CID is removed from the CCID, and the memory further contains instructions that when executed by the processing unit causes the SDA to:
    determine a time period during which the content of the old CID is stored; and
    remove the content of the old CID from the fast access memory after the time period is reached.

18. The SDA of claim 17, wherein the removed content of the old CID is stored in the slower storage.

19. The SDA of claim 12, wherein the memory further contains instructions that when executed by the processing unit to determine if the content of the CID needs to be acquired to the SDA, further causes the SDA to:
  count the number of requests for the content of the CID for each CID.

20. The SDA of claim 19, wherein acquiring the content is performed after the number of requests for the content of the CID is exceeded a threshold of a counting.

21. The SDA of claim 12, wherein the redirect instruction is sent to the UN before the content of the CID is acquired.

22. The SDA of claim 12, wherein the live broadcast is a live event.

\* \* \* \* \*